N. DECARIE.
THERMOMETER.
APPLICATION FILED OCT. 23, 1920.

1,420,022.  Patented June 20, 1922.

Inventor
Noel Decarie
By
Attorney

UNITED STATES PATENT OFFICE.

NOEL DECARIE, OF MONTREAL, QUEBEC, CANADA.

THERMOMETER.

1,420,022. Specification of Letters Patent. Patented June 20, 1922.

Application filed October 23, 1920. Serial No. 419,155.

*To all whom it may concern:*

Be it known that I, NOEL DECARIE, a British subject, residing at #324 Bleury Street, in the city of Montreal, in the Province of Quebec, in the Dominion of Canada, have invented certain new and useful Improvements in Thermometers; and I do hereby declare that the following is a full, clear, and exact description of the same.

The present invention relates to improvements in thermometers, particularly those of the type commonly known as clinical thermometers, and the main object of the invention principally resides in providing means to facilitate the carrying of the mercury in the thermometer below normal, after it has been used. The usual method employed in carrying the mercury below normal up to date consists in tapping the thermometer until the mercury has reached the normal. In the present invention, means have been provided so that by whirling the thermometer around once or twice, it will be quite sufficient to carry the mercury back to normal.

Another object of the invention is to provide means which will practically not increase the cost of manufacture of a thermometer, and by which means the object of this invention may be carried out.

To better understand the invention reference should be had to the accompanying description and drawings, in which.

Like numerals of reference indicate corresponding parts in each figure.

Figure 1:
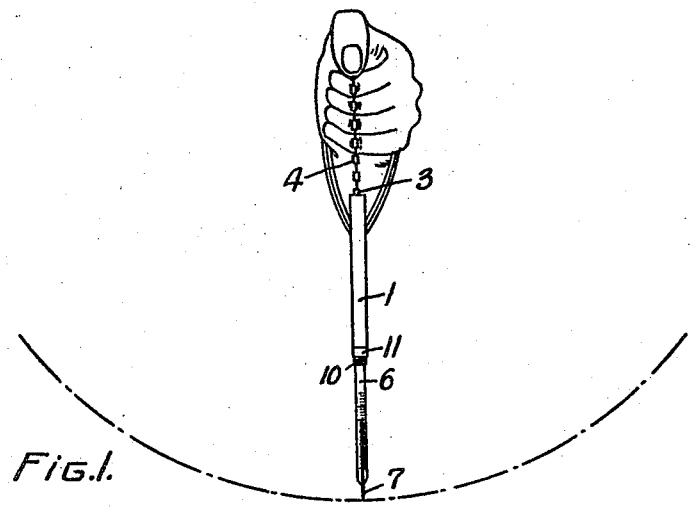
Figure 1 is an illustration of the manner of holding the thermometer in order to give it a gyratory movement.

Referring to the drawings, 1 is a casing having an open end, which is provided with an inner threaded portion 2, and 3 is an eyelet secured at the closed end of said casing. To said eyelet is secured a chain 4, and 5 is a safety pin mounted at the free end of said chain in order to secure the casing in a pocket, etc. 6 is the thermometer which preferably consists of a capillary tube, terminating at one end with an elongated bulb 7, adapted to contain a suitable fluid, such as mercury, said tube 6 being provided on one side thereof with a plurality of dividing lines 8 indicating the different degrees of temperature. At the other end of said tube is mounted a cap 9 which is provided with a threaded portion 10 adapted to engage the threaded portion 2 in said casing 1, so as to secure the thermometer therein. The said cap 9 is preferably provided intermediate thereof with a dividing portion 11, and 12 is another threaded portion preferably projecting in an opposite direction to said threaded portion 10.

Figure 2:
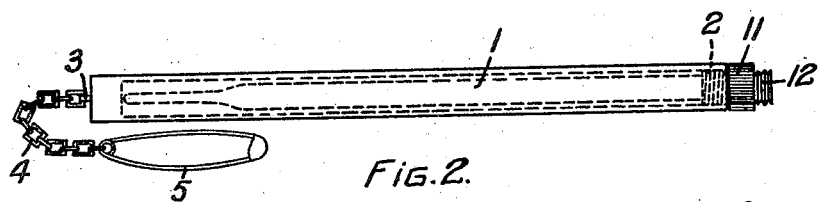
Figure 2 is an enlarged side elevation of the thermometer in its casing.
Figure 3:
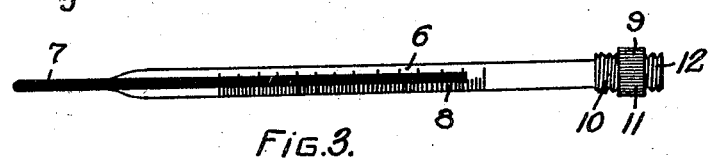
Figure 3 is a side elevation of the thermometer.
Figure 4:
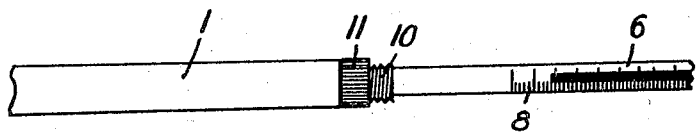
Figure 4 is a side elevation of a portion of the thermometer as it should be secured to the casing in order to operate it.

In the operation of this thermometer, once the temperature has been taken, and that it is necessary to carry the mercury back to normal, the threaded portion 12 is screwed in the threaded portion 2 in said casing 1, so that the thermometer will project outwardly from said casing, as disclosed in Figures 1 and 2. The securing pin 5 is preferably held firmly in one hand (see Figure 1) the casing 1 and the thermometer 6 dropping vertically, after which it is swung around with the result that the centrifugal force will cause the mercury to travel back to normal.

Figure 5:
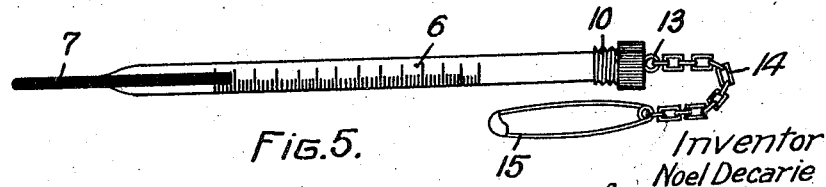
Figure 5 is a modified form of a thermometer.

In Figure 5 of the drawings is illustrated a slightly modified form of thermometer, which consists in eliminating the threaded portion 12 on the cap 9, and in providing in place thereof an eyelet 13 to which is secured a chain 14, and at the free end of which is mounted the fastening pin 15. If the thermometer is constructed in this way, it will readily be seen that the eyelet 3 and chain 4 on the casing 1 disclosed in Figures 1 and 2 will not be necessary and in this case the thermometer is not secured to the casing, but held directly in the same manner as described above and given a gyratory movement with the result that the mercury will fall back to normal.

What I claim as my invention is:—

1. In combination a casing, a thermometer comprising a capillary tube having a bulbed end adapted to contain a fluid; a cap secured on the end of said tube opposite the bulbed end, said cap having a threaded inner portion adapted to engage a corresponding threaded portion in said casing; means on said cap to secure said thermometer to said casing so as to extend outwardly therefrom;

and means whereby said thermometer can be given a gyratory movement.

2. In combination with a casing having at one end thereof a supporting chain; a thermometer comprising a capillary tube having a bulbed end adapted to contain a fluid; a cap secured on the end of said tube opposite said bulbed end; and means on said cap whereby said tube may be secured to said casing to project outwardly therefrom.

3. In combination a thermometer; a casing therefor; a cap secured to said thermometer having two screw-threaded portions, said casing being open at one end only and having a screw-threaded portion to receive either of the two screw-threaded portions on said cap, one portion being used to hold the thermometer within the casing and the other to hold the thermometer projecting from the casing whereby the casing constitutes an extension thereof; and a chain secured to the closed end of the casing and serving as a means whereby the thermometer may be given a rotating movement.

Signed at Montreal, Quebec, Canada, this 5th day of October, 1920.

Dr. NOEL DECARIE.

Witnesses:
C. PATENAUDE,
A. TUOIE.